Dec. 22, 1925.                                                    1,566,729
                          J. A. BROYLES
                 COUPLING FOR CARS AND TRAIN LINES
                   Filed Feb. 29, 1924          5 Sheets-Sheet 1

Inventor
James A. Broyles

By Larry Lacey, Attorneys

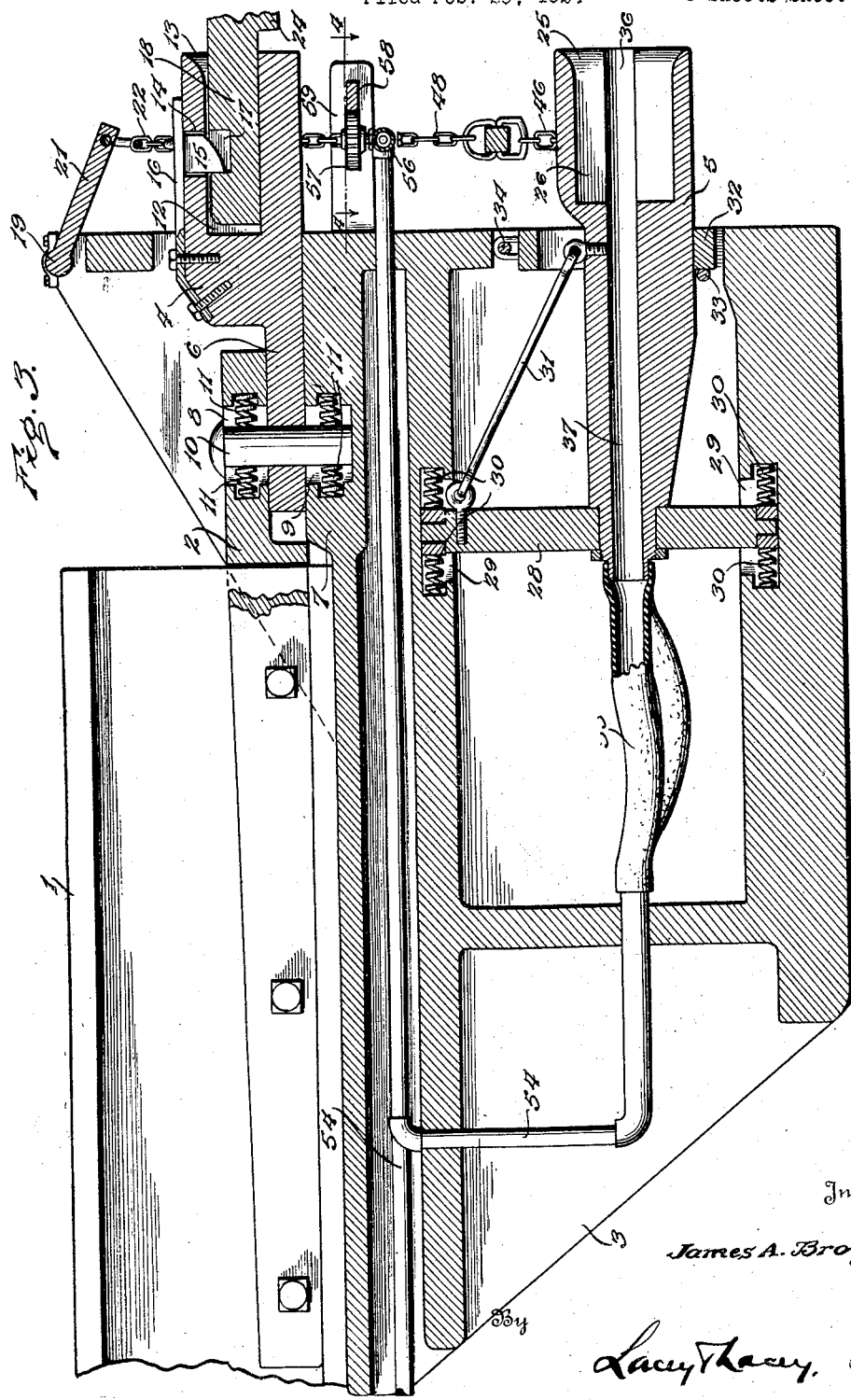

Dec. 22, 1925.  
J. A. BROYLES  
1,566,729  
COUPLING FOR CARS AND TRAIN LINES  
Filed Feb. 29, 1924  
5 Sheets-Sheet 3
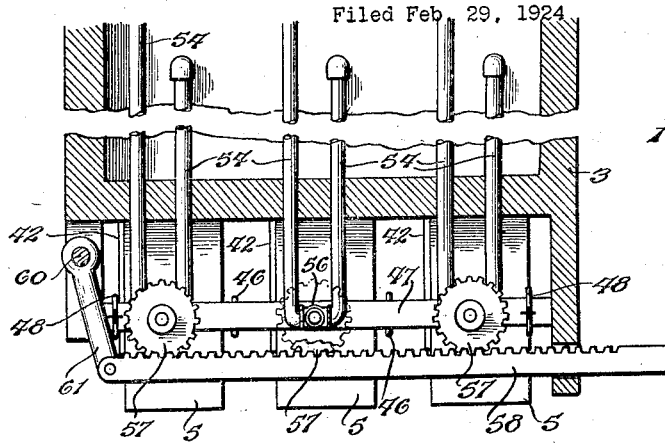
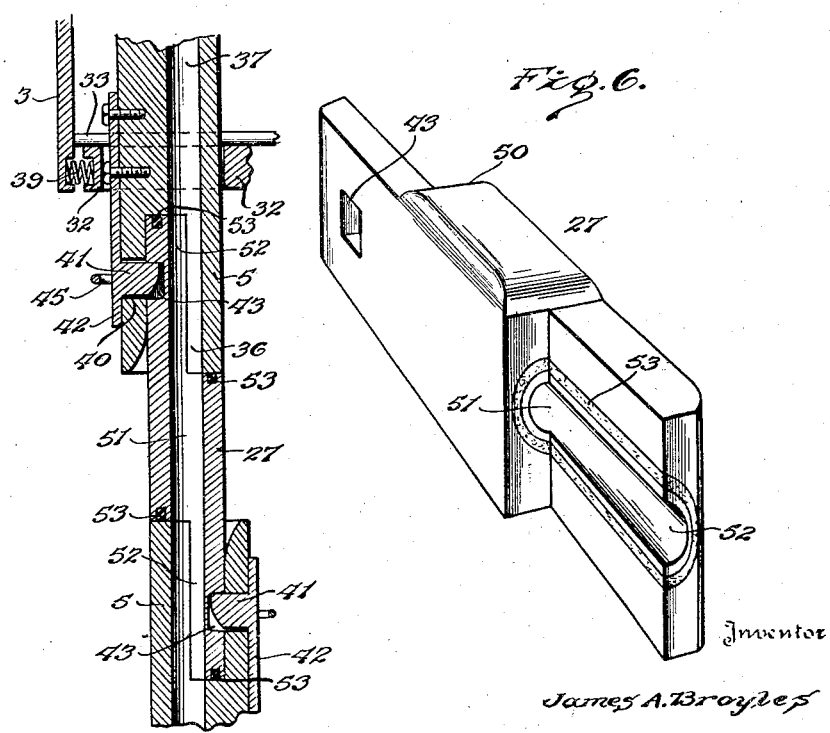
Inventor  
James A. Broyles  
By  
Lacy Loxey, Attorneys

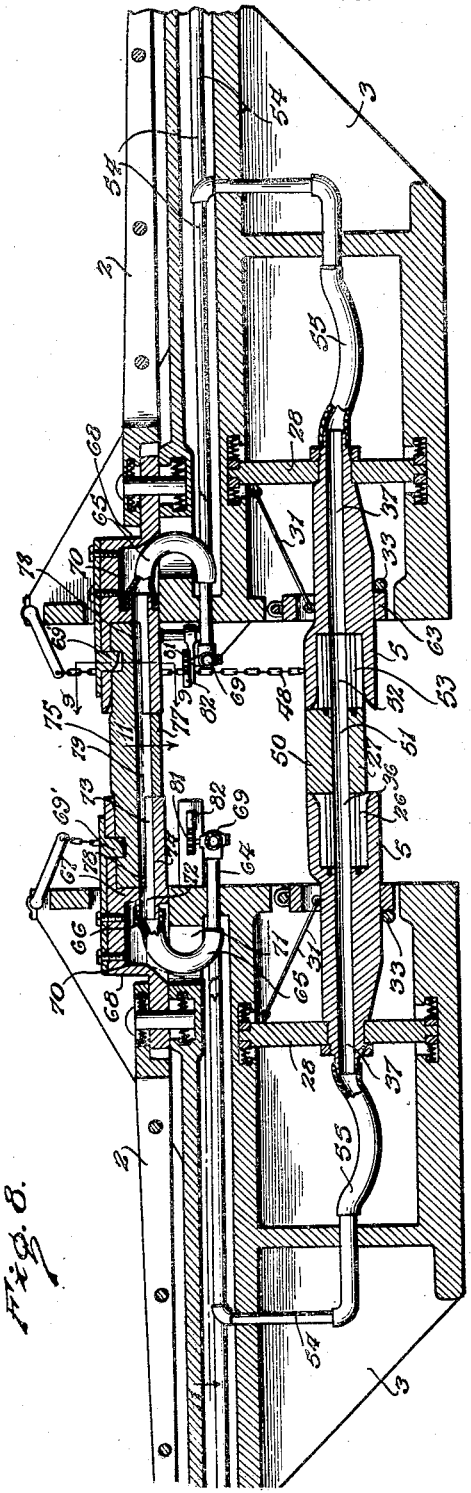

Dec. 22, 1925.  
J. A. BROYLES  
1,566,729  
COUPLING FOR CARS AND TRAIN LINES  
Filed Feb. 29, 1924  5 Sheets-Sheet 5
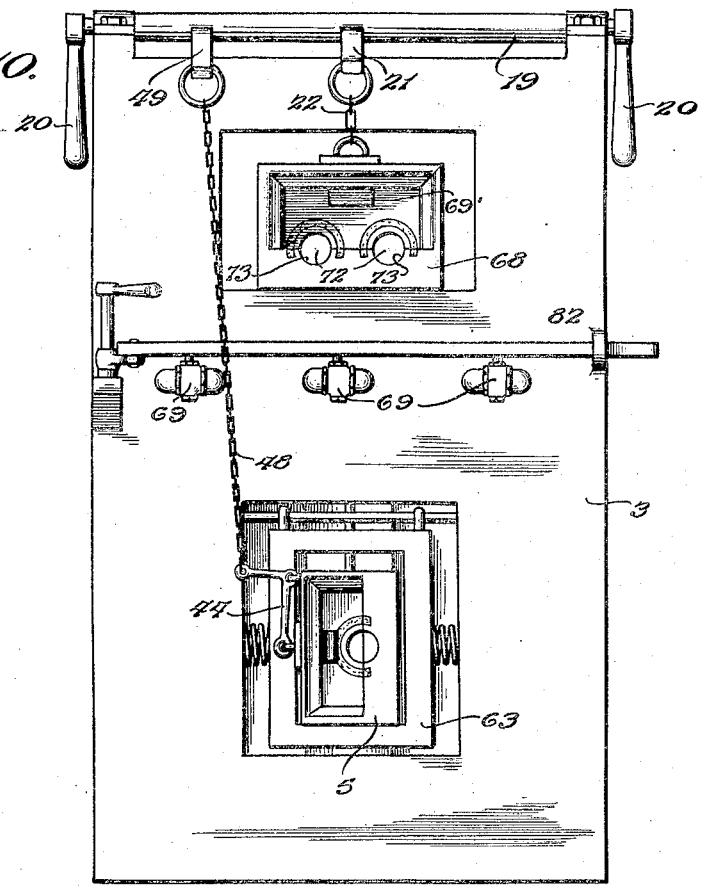
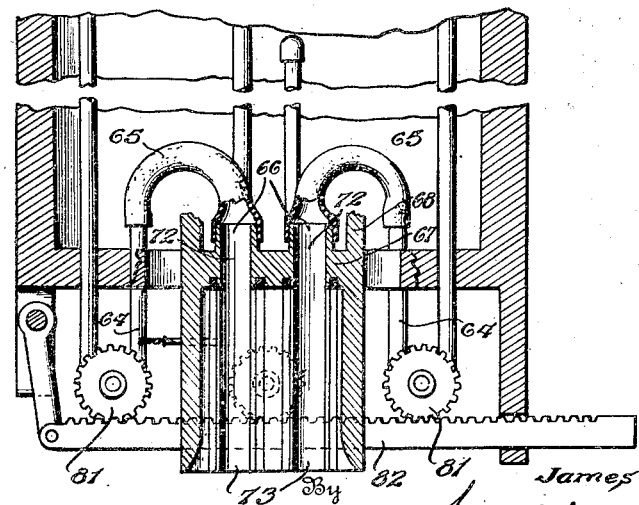
Inventor  
James A. Broyles  
By Lacey & Lacey, Attorneys Patented Dec. 22, 1925.

1,566,729

UNITED STATES PATENT OFFICE.

JAMES A. BROYLES, OF DUNGLEN, OHIO.

COUPLING FOR CARS AND TRAIN LINES.

Application filed February 29, 1924. Serial No. 696,028.

*To all whom it may concern:*

Be it known that I, JAMES A. BROYLES, a citizen of the United States, residing at Dunglen, in the county of Jefferson and State of Ohio, have invented certain new and useful Improvements in Couplings for Cars and Train Lines, of which the following is a specification.

This invention relates to coupling devices for use on railway cars and has for its object the provision of novel means whereby the cars will be coupled and the train lines for carrying air, steam and water will be simultaneously effectually coupled. The invention also has for its object the provision of novel means whereby the flow of fluid through the air, steam or water lines may be cut off or established, and also has for its object the provision of means whereby the train lines may be simultaneously uncoupled when a train is to be broken. The invention further seeks to provide a novel coupling link which may be retained in either car when the cars are uncoupled so that the detached car will be in condition to be coupled into another train whenever such use is needed. The invention also seeks to provide operating mechanism whereby the coupling or uncoupling may be effected without requiring a brakeman to enter between cars. Other incidental objects of the invention will appear in the course of the following description, and the invention resides in certain novel features which will be hereinafter fully set forth.

In the accompanying drawings:

Figure 1 is a side elevation of a portion of the ends of two cars having my improved coupling applied thereto;

Fig. 2 is an enlarged end elevation of the coupling devices on the end of one car;

Fig. 3 is an enlarged longitudinal vertical section through one coupling on the line 3—3 of Fig. 2;

Fig. 4 is a horizontal section on the line 4—4 of Fig. 3;

Fig. 5 is a longitudinal section through one train line on the line 5—5 of Fig. 2;

Fig. 6 is an enlarged detail perspective view of the coupling link shown in Fig. 5;

Fig. 7 is a detail perspective view of the link which is used in coupling opposed drawheads;

Fig. 8 is a central longitudinal vertical section of two drawheads coupled together, this figure also showing an arrangement for the train lines differing in some respects from that shown in the previously mentioned figures;

Fig. 9 is a detail section of the coupling link shown in Fig. 8, the section being taken on the line 9—9 of Fig. 8;

Fig. 10 is an end elevation of one of the coupling members shown in Fig. 8, and

Fig. 11 is a horizontal section on the line 11—11 of Fig. 8.

In the drawings, the reference numeral 1 indicates a portion of the end of a railway car to which my improved coupling devices have been applied. A draft bar 2 is secured rigidly to the under framing of the railway car and below the draft bar a pipe-carrying frame 3 is suspended from the said under framing in any preferred or convenient manner. The frame 3 is intended to support all of the coupling elements and embodies an end plate or wall having openings therein for the drawhead 4 and the train line heads 5. The drawhead 4 is provided with a rearwardly extending tongue 6 which projects under the outer end of the draft bar 2 and is supported and guided by the end of the draft bar and by a platform portion 7 of the frame 3. A slot 8 is provided in the draft bar 2 and a recess or slot 9 is provided in the platform 7, as shown clearly in Fig. 3. A pin 10 is carried by the extension 6 of the drawhead, and the ends of this pin play in the slot 8 and the recess 9 respectively, buffer springs 11 being provided within each recess in front and rear of the pin so that, while the drawhead will be permitted to yield to the impact of an opposing drawhead in the act of coupling and may yield somewhat to the draft imposed thereon while the train is in motion, it will be normally centered and damage due to the shocks of travel will be avoided. This manner of mounting the drawhead also permits it to readily accommodate itself to the relative angular positions of the cars when rounding curves. The drawhead 4 is provided with a chamber 12 extending rearwardly from its mouth 13 and the walls of the mouth are preferably beveled, as shown in Fig. 3. In the upper wall of the drawhead is an opening 14 through which plays a lug or latch 15 carried by a spring plate 16 which is secured at its rear end upon the drawhead. The latch 15 is adapted to enter a recess 17 in the upper side of the link 18 and thereby retain the link within the chamber 12 of the drawhead when two drawheads are coupled together. At the top of the frame 3 is mounted a rock shaft 19 which extends to the sides of the said frame and is equipped at its ends with cranks or other suitable handles, indicated at 20. At the center of the rock shaft 19 is a lifting arm 21 which is connected by a chain or other flexible connection 22 with the upper side of the spring plate 16 carrying the latch 15. When it is desired to uncouple the cars, the shaft 19 is rocked so that the arm 21 will be swung upwardly and the latch 15 thereby withdrawn from its engagement in the socket or recess 17, whereupon the link 18 will be drawn from the drawhead by the travel of the coupled car. The link may be retained in the drawhead of either car at will and the usual practice will be to permit the link to remain in the car which is cut off the train so that, when it is desired to couple said car into another train, it will not be necessary to hunt for coupling links. As shown most clearly in Fig. 7, the ends of the link are tapered, as indicated at 23, so that they will readily enter the drawhead and it is provided midway its ends with a lateral enlargement 24 which serves to reinforce the link and also to limit the extent to which it may be inserted in a drawhead. The link is provided with a recess 17 adjacent each end, but both recesses are in the same side of the link so that, when the link is inserted in one drawhead, it will be in proper position to be engaged by the latch in the opposed drawhead. Inasmuch as the link is provided with the enlargement 24 on one side at its center and the recesses are both on the opposite side of the link, these elements serve as guides to bring the link into proper position when it is being inserted in one drawhead preparatory to coupling the cars.

The heads 5 of the train lines are duplicates in construction and are supported in the frame 3 in the same horizontal plane of said frame below the drawhead 4, as shown and as will be readily understood. Each head is provided with a flared or beveled mouth 25 and with an enlarged chamber 26 extending rearwardly from the mouth and adapted to receive one end of a link 27. The head 5 is extended rearwardly within the supporting frame 3 and has its rear extremity secured in a transverse bridge or supporting plate 28 which has its ends fitted slidably in recesses 29 provided therefor in the upper and lower webs of the frame 3, buffer springs 30 being provided within each of said recesses at the opposite sides of the ends of the bridge so that the train pipe heads will be permitted to yield under the impact of an opposed head in the act of coupling and will also be normally held in proper position for effectual coupling. A brace 31 extends between the upper end portion of the bridge 28 and the upper side of the head 5 adjacent the front end thereof so that the weight of the head will be distributed and the dropping of the free end thereof will be counteracted. To further support the head within the frame 3, a yoke 32 is provided in the front wall of the frame 3 and the several heads 5 rest slidably upon the lower cross bar or member of the said yoke, a suitable stop 33 being provided within the frame 3 immediately at the rear of the yoke, as shown clearly in Fig. 3, while the upper bar of the yoke is hung upon a cross rod 34 disposed transversely in the yoke. As shown most clearly in Fig. 2, the mouth of the coupling head 5 is provided with one straight vertical wall 35 in which, midway the top and bottom thereof, is formed a semi-cylindrical longitudinal groove 36 which is alined axially with and forms a continuation of the bore 37 of the head. The several heads 5 are carried by the yoke 32 which is constructed with vertical partitions 38 between the center head and the two side heads so as to separate the same but at the same time permit them to have sufficient lateral movement to accommodate the angular relation of the cars in passing around curves. The yoke is normally held to the central vertical plane of the coupling mechanism by springs 39 disposed between the ends of the yoke and the side walls of the frame 3, said springs being secured in any convenient manner to prevent them dropping out of place.

In that side of each head 5 opposed to the groove 36 is an opening 40 to accommodate a latching lug 41 carried by a spring plate 42 which is secured upon the side of the head, as shown most clearly in Fig. 5. This latching lug 41 is adapted to enter a recess 43 in the side of the link 27 and thereby retain the link in coupled engagement with the train pipe head, as will be understood upon reference to Fig. 5. Fulcrumed upon the side of each head 5 adjacent the top thereof is an angle lever 44 having one arm depending from its fulcrum and engaged in an eye or hook 45 on the outer side of the spring latching plate 42, while the other arm of the lever extends outwardly and is connected by a chain or its equivalent 46 with a lifting bar 47 disposed transversely of the frame 3 and supported by chains 48 hung from lifting arms or cranks 49 provided on the rock shaft 19 adjacent the ends of the same, as shown clearly in Fig. 2. When it is desired to uncouple the cars, the rocking of the shaft 19 to release the latch 15, as hereinbefore described, will simultaneously raise the lifting bar 47 and thereby draw upon the angle levers 44 so as to swing them about their fulcrums and thereby release the latching lugs 41 from their engagement with the respective recesses 43 in the links 47 so that the said links may then withdraw from the train pipe heads.

The train line coupling links 27 each comprises a central body portion which is preferably offset on one edge, as at 50, whereby the space between opposed train line heads will be filled and play of the link between the heads will be avoided. Extending centrally through the body of the link is a bore 51 which merges into a semi-cylindrical groove 52 at each end of the link, which groove is adapted to register with the groove 36 in the engaged head so that, when the two train pipe heads are coupled, a continuous passage for the fluid will be provided. Packing strips 53 are fitted in suitable grooves provided therefor in the several faces of the link, as shown clearly in Figs. 5 and 6, so that, when the train pipes are coupled, leakage of the fluid passing therethrough will be prevented. The links 27 have their ends relatively offset, and the latching recesses 43 are provided in the outer face of each offset portion so that whichever end of the link be presented to a coupling head, the link will enter the head in proper position to effect coupling and maintain a fluid-tight joint with the head for the passage of the fluid.

The train lines proper are indicated at 54 and may be metallic pipes. Each pipe has one end arranged in axial alinement with the bore 37 of the respective train line coupling head 5, and a hose or flexible pipe 55 has its ends engaged upon the opposed ends of the alined pipe and pipe coupling head, as shown clearly in Fig. 3. The train line is carried upwardly from the horizontal plane of the respective head 5 within the frame 3 and is then brought forward to project through the front end wall of the frame where it is coupled into a valve casing 56. From the said valve casing the main portion of the pipe is carried under the car to the opposite end thereof substantially parallel with the branch extending forwardly to the valve casing. Between the ends of the car, suitable connections (not shown) are made with the main portion of the train line to connect it with the parts to be supplied, it being intended to supply one line for carrying air to operate the brakes, another line to carry water for toilet purposes, and a third line to carry steam for heating the several cars. Obviously, however, a greater or less number of train lines may be provided without involving any substantial departure from my invention. Within each valve casing 56 is provided a valve, preferably of the turning plug type, having its stem extending through and above the valve casing and equipped with a pinion 57, one of the pinions being broken away in Fig. 4 so as to more clearly indicate the position of the valve casing. The several pinions 57 mesh with a rack bar 58 disposed in front of the pinions and supported in a horizontal position across the end of the frame 3. At one side of the frame is provided a guide arm or bracket 59 through which the end of the rack bar 58 slidably projects and at the other side of the frame 3 is provided a vertically disposed short rock shaft 60 to which is secured a crank 61 having its free end pivotally connected with the adjacent end of the rack bar, as will be readily understood upon reference to Figs. 2 and 4. The vertical rock shaft 60 is equipped with a suitable handle 62 at its upper end whereby it may be manipulated without requiring the brakeman to pass between the cars. It will be readily understood that, if the handle 62 be swung in one direction, the rack bar 58 will be caused to rotate the pinions 57 in a corresponding direction to simultaneously open all the valves while swinging the handle in the opposite direction will simultaneously close all the valves. Obviously, the valves are to be closed before uncoupling is effected and to be opened after coupling has been effected so that there may be an uninterrupted flow of fluid through the entire length of the train and, when the cars are uncoupled, the escape of fluid through the ends of the train lines at the end of the train will be prevented.

While I prefer to arrange the couplings for all the train pipes below the couplings of the drawheads inasmuch as stoppage in any one train line will not affect the other train lines when such arrangement is employed, it is possible to utilize the drawhead coupling as a means for also coupling the train lines and, when such method is employed, the total weight of the coupling mechanism is reduced and the space occupied by the couplings is also reduced. I consider it advisable to always provide a separate coupling for the train line carrying water and, therefore, in the modified arrangement illustrated in Figs. 8 to 11, I have shown the link 27 connecting the heads 5 for the water line. In this modified arrangement, the yoke 63, corresponding to the yoke 32 of the previously described form, is, of course, a mere rectangular frame of such dimensions as to support one train pipe head and, inasmuch as only a single angle lever 44 is needed, the lifting bar 47 is dispensed with and the chain or cable 48 is carried directly upward to the crank or lifting arm 49. The water line is disposed, in every respect, the same as the water line in the arrangement shown in Figs. 1 to 5 but the air line and the steam line are not carried down to heads 5 in the lower portion of the frame. These lines have one horizontal branch 64 connected by a hose or flexible pipe 65 with a nipple 66 formed on the inner or rear side of a transverse web 67 in the drawhead 68, a valve 69 corresponding in all respects to the valves 56 being provided between the horizontal branches of these train lines, as will be readily understood. The drawhead 68 is connected with the draft bar 2 in the same manner as the drawhead 4 is connected therewith and is provided with a latching lug 69' corresponding in all respects to the latching lug 15 and operated in the same manner. The interior of the drawhead 68, however, is provided with a chamber 70 in rear of the transverse web 67, the said chamber 70 receiving or accommodating the hose 65 which is carried upwardly through an opening 71 in the uppermost web or platform member of the frame 3, as shown in Fig. 8. An opening 72 is formed through the web 67 of the drawhead, and this opening is continued into the coupling chamber of the drawhead by a semi-cylindrical groove 73 formed in the bottom web 74 of the drawhead, as shown. The coupling link 75 is provided in its upper side with a recess 76 adapted to be engaged by the latching lug 69' whereby the link will be held within the drawhead, and midway the ends of the link is an offset 77 adapted to fit closely between the opposed drawheads, as shown in Fig. 8. In the bottom of the link, at each end of the same, is a semi-cylindrical groove 78 which forms a continuation of the circular bore 79 formed through the central portion of the link so that, when the drawheads are coupled, a continuous passage for the fluid will be provided through them. Packing 80 is provided in the outer face of the link at both ends thereof around the grooves 78 so that a fluid-tight joint with the respective drawheads will be effected. In this form of the invention, the valves 69 are controlled by pinions 81 and a rack bar 82, corresponding in all respects to the pinions 57 and the rack bar 58, as shown and as will be readily understood.

From the foregoing description, taken in connection with the accompanying drawings, it will be seen that I have provided a simple and compact arrangement whereby the cars of a train will be effectually coupled, and at the same time the several train lines will be coupled in such a manner that leakage and loss of the fluids flowing through the train lines will be prevented. To effect coupling of the cars, it is necessary only to see that the requisite links are engaged in the heads on one car, after which the two cars are moved together. It is not necessary for the brakeman to pass between the cars and loss of life or limb is thereby avoided. After the several heads have been coupled, the valves controlling the flow of fluid through the train lines are opened by a brakeman standing at the side of the train, and the operation consists merely in turning a crank handle whereby all the valves will be simultaneously opened. Moreover, when it is desired to uncouple the cars, the several links may be released simultaneously by merely rocking the controlling shaft disposed above the drawhead couplings. The several heads are so supported and mounted that they will readily accommodate the angular relation of the cars in passing around curves and will maintain the coupled relation of the parts in such positions. Moreover, the several heads will yield to the impact of an opposing car in the act of coupling and will also quickly respond and tend to normally hold the several heads outwardly with respect to the car so that the heads will be held to the links and in effectual engagement therewith. The main supporting and carrying frame upon which all the coupling elements are mounted is of such form that it constitutes a complete housing for all the train pipes and the hose which constitutes sections thereof so that injury to the train lines from chance blows is effectually prevented.

Having thus described the invention, what is claimed as new is:

1. In coupling mechanism, a supporting frame having an outer end wall provided with an opening therethrough, a yoke suspended from the top wall of said opening, yieldable means resisting lateral movement of the yoke, a coupling head extending loosely through and supported at its outer end portion by said yoke, and a bridge secured to the inner end of the head and slidably mounted in the frame.

2. In coupling mechanism, a supporting frame having an outer end wall provided with an opening therethrough, a yoke suspended from the top wall of said opening, a coupling head extending loosely through and supported at its outer end by said yoke, a bridge secured to the rear end of the head and having its ends slidably engaged in the frame, and yieldable means housed in the frame and bearing upon opposite sides of the bridge to hold it normally in a set position.

3. In a coupling for cars, the combination of heads having longitudinal passages therethrough and provided with coupling chambers at their outer ends each having a groove in one side wall constituting an extension of the said passage, train pipes connected with the inner ends of the heads and communicating with the passages through the same, flat links having off-set ends adapted to enter opposed heads, the off-set ends of the links being each provided with a longitudinal groove in one side adapted to register with the groove in the engaged head and the intermediate portion of each link having a longitudinal bore alined with the respective grooves, the intermediate portions of the links abutting the engaged heads, means for locking the links in the heads, and means for releasing the locking means.

4. In an apparatus for the purpose set forth, the combination of supporting frames, means for coupling opposed frames, train pipes mounted in the frames, means carried by the frames for coupling the train pipes, valves within the train pipes, said valves having stems provided with pinions, and a rack bar slidably mounted upon the supporting frame and meshing with all said pinions to open or close the valves.

In testimony whereof I affix my signature.

JAMES A. BROYLES. [L. S.]